US012731384B2

(12) United States Patent
Aramaki

(10) Patent No.: US 12,731,384 B2
(45) Date of Patent: Sep. 8, 2026

(54) EVALUATION METHOD

(71) Applicant: CANON KABUSHIKI KAISHA, Tokyo (JP)

(72) Inventor: Yuji Aramaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 313 days.

(21) Appl. No.: 18/466,160

(22) Filed: Sep. 13, 2023

(65) Prior Publication Data

US 2024/0104908 A1 Mar. 28, 2024

(30) Foreign Application Priority Data

Sep. 27, 2022 (JP) ................................ 2022-154003

(51) Int. Cl.

*G06V 10/776* (2022.01)
*G06V 10/40* (2022.01)
*G06V 20/50* (2022.01)

(52) U.S. Cl.

CPC ............ *G06V 10/776* (2022.01); *G06V 10/40* (2022.01); *G06V 20/50* (2022.01)

(58) Field of Classification Search

CPC ...... G06V 10/776; G06V 10/40; G06V 20/50; G06V 10/993

See application file for complete search history.

(56) References Cited

U.S. PATENT DOCUMENTS

| | | | | |
|---|---|---|---|---|
| 11,526,710 | B1 * | 12/2022 | Salo | G06V 10/764 |
| 2012/0288198 | A1 * | 11/2012 | Tojo | G06V 20/52 382/173 |
| 2013/0114854 | A1 * | 5/2013 | Yoneyama | H04N 23/673 382/103 |
| 2023/0386184 | A1 * | 11/2023 | Duffy | G06N 3/09 |
| 2024/0185586 | A1 * | 6/2024 | Chou | G06V 10/761 |
| 2024/0242410 | A1 * | 7/2024 | Kim | G06V 10/774 |

FOREIGN PATENT DOCUMENTS

| | | |
|---|---|---|
| JP | 2008-234626 A | 10/2008 |

OTHER PUBLICATIONS

Rijsbergen, C.J., "Information Retrieval," Department of Computer Sciences, University of Glasgow, 1979, pp. 1-153.

Japanese Office Ation issued Jun. 26, 2026 during prosecution of corresponding Japanese application No. 2022-154003. (English-language machine translation included).

* cited by examiner

*Primary Examiner* — Han Hoang
(74) *Attorney, Agent, or Firm* — VENABLE LLP

(57) ABSTRACT

An evaluation method for an image analysis system comprises acquiring an output value by inputting an evaluation image to the image analysis system, acquiring an accuracy of the output by comparing an expected value and the output value, and evaluating characteristics of the image analysis system based on a relation between a factor and the accuracy of the output.

21 Claims, 6 Drawing Sheets

F I G. 1
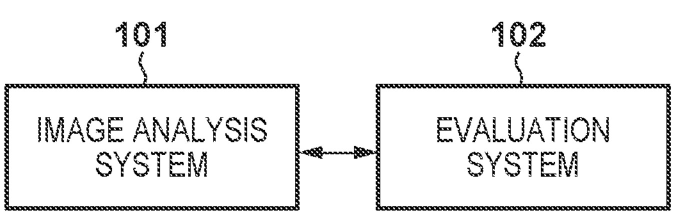
F I G. 2
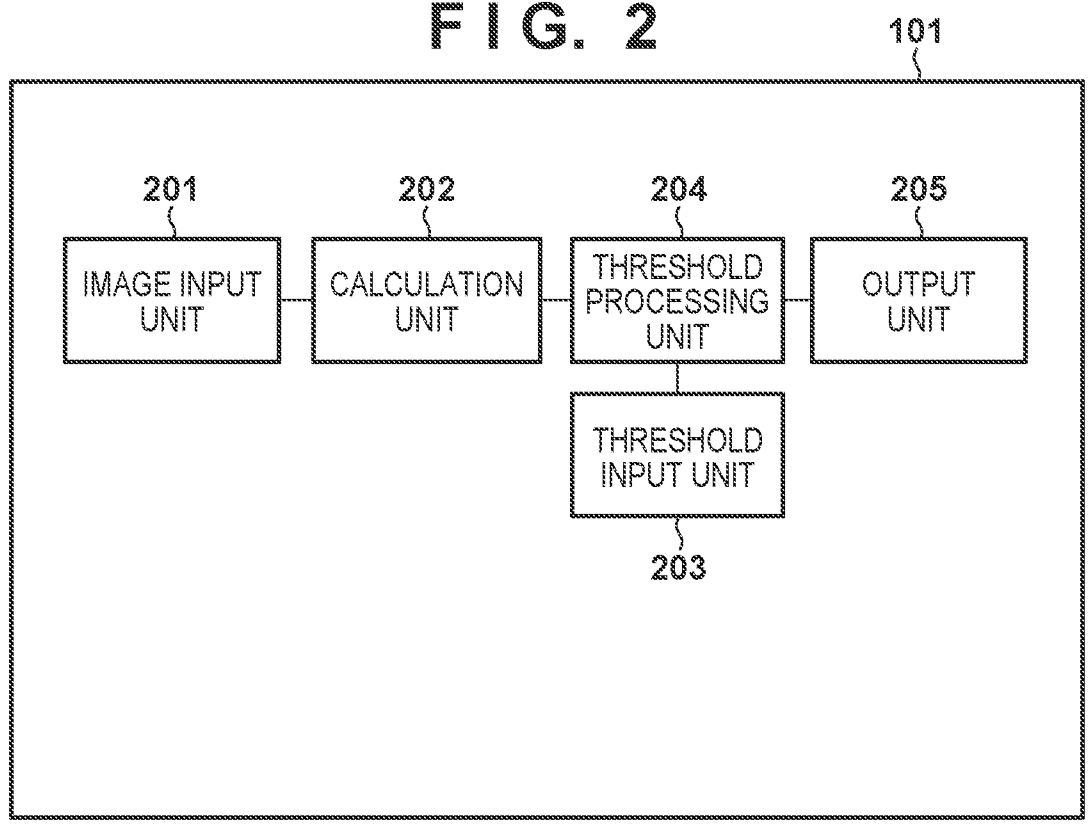

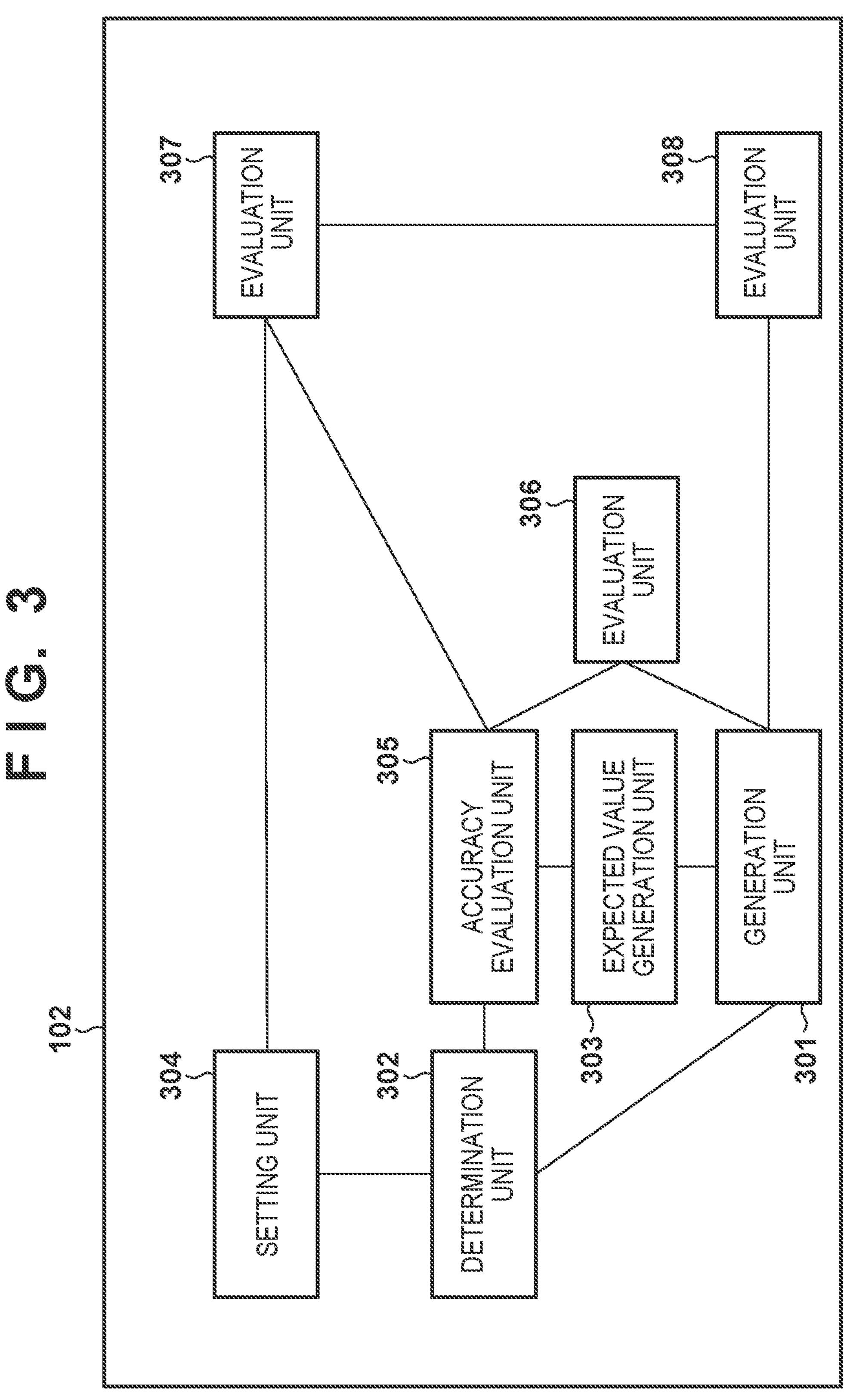
F I G. 3
102
304
SETTING UNIT
302
DETERMINATION UNIT
303
EXPECTED VALUE GENERATION UNIT
301
GENERATION UNIT
305
ACCURACY EVALUATION UNIT
306
EVALUATION UNIT
307
EVALUATION UNIT
308
EVALUATION UNIT

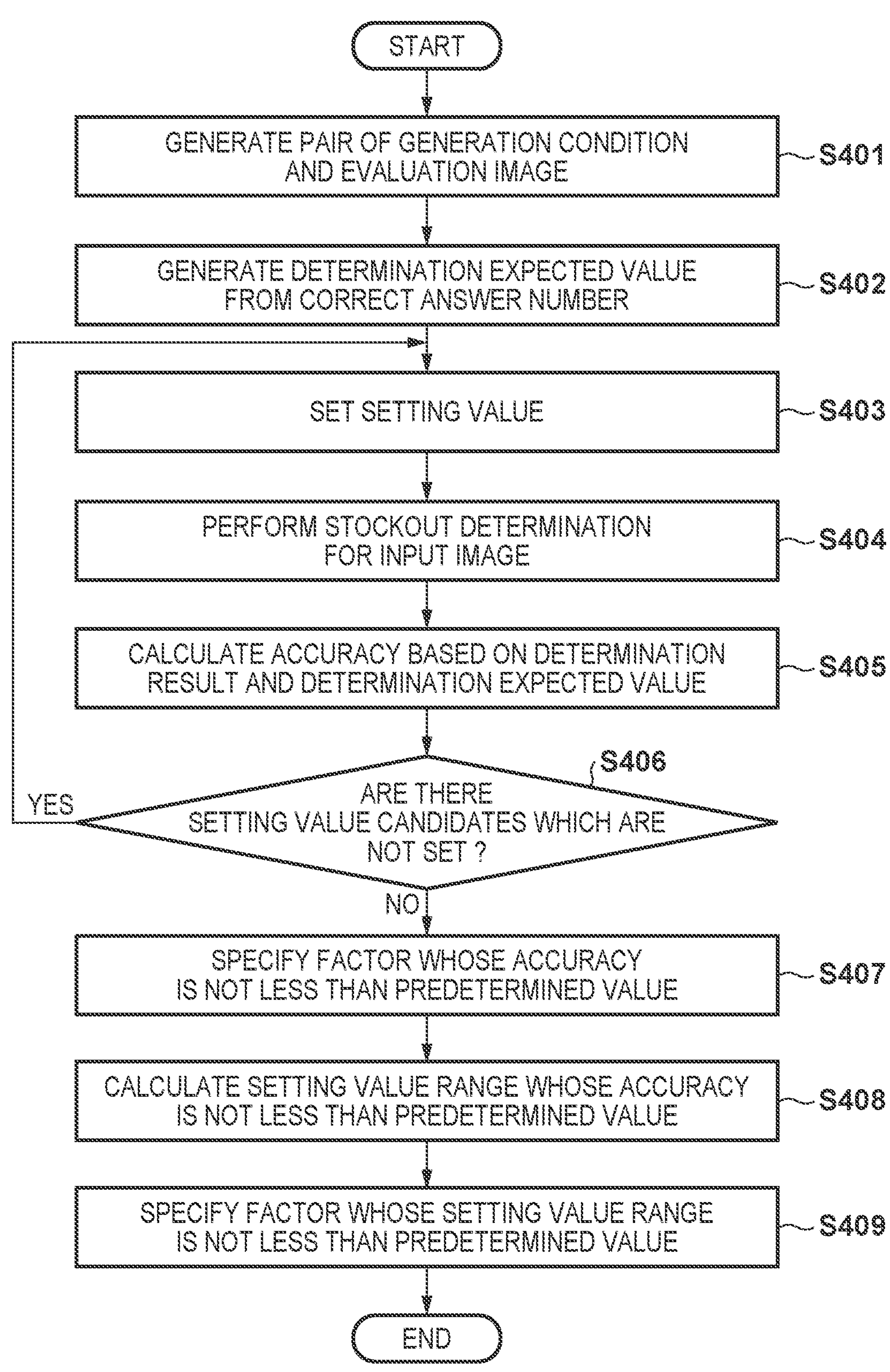
F I G. 4
START
GENERATE PAIR OF GENERATION CONDITION AND EVALUATION IMAGE
S401
GENERATE DETERMINATION EXPECTED VALUE FROM CORRECT ANSWER NUMBER
S402
SET SETTING VALUE
S403
PERFORM STOCKOUT DETERMINATION FOR INPUT IMAGE
S404
CALCULATE ACCURACY BASED ON DETERMINATION RESULT AND DETERMINATION EXPECTED VALUE
S405
S406
ARE THERE SETTING VALUE CANDIDATES WHICH ARE NOT SET ?
YES
NO
SPECIFY FACTOR WHOSE ACCURACY IS NOT LESS THAN PREDETERMINED VALUE
S407
CALCULATE SETTING VALUE RANGE WHOSE ACCURACY IS NOT LESS THAN PREDETERMINED VALUE
S408
SPECIFY FACTOR WHOSE SETTING VALUE RANGE IS NOT LESS THAN PREDETERMINED VALUE
S409
END F I G. 8
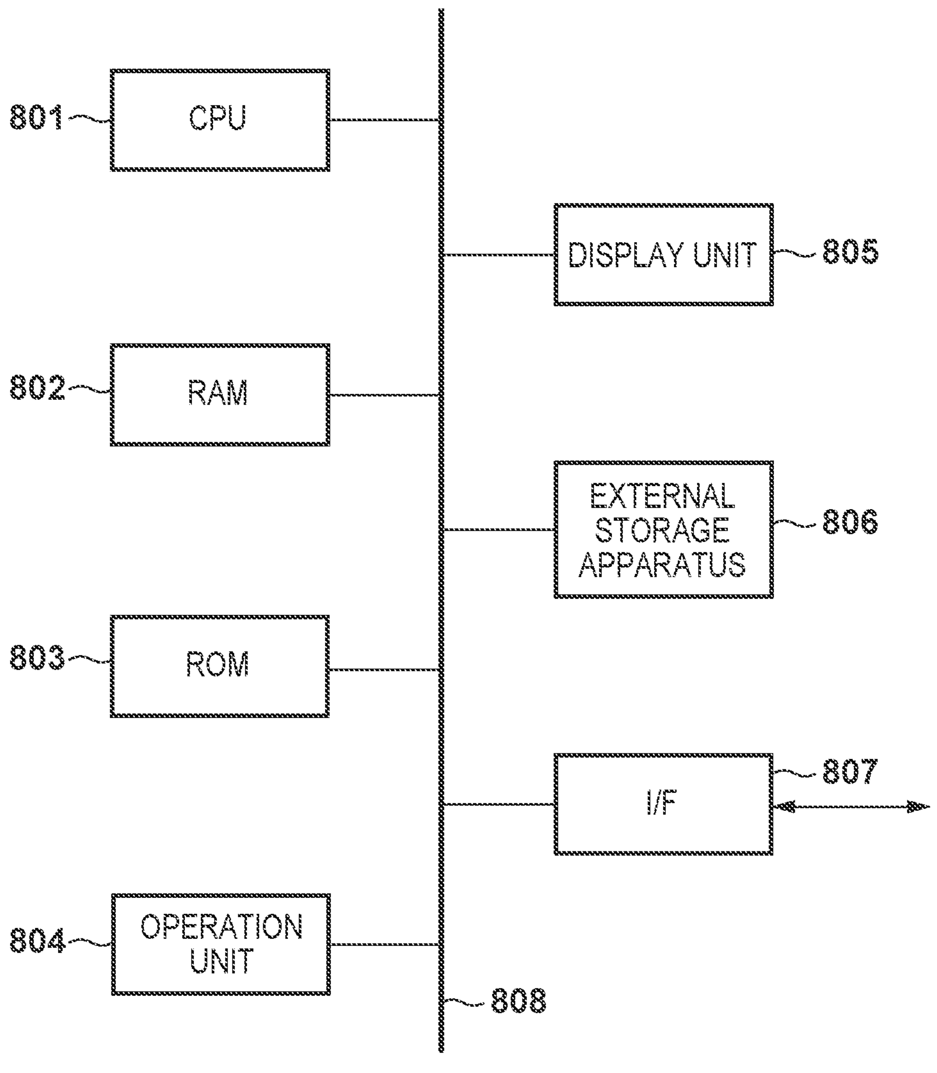

EVALUATION METHOD

BACKGROUND

Field

The present disclosure relates to an evaluation technique of an image analysis system.

Description of the Related Art

With the development of a machine learning technique, there are also increasing numbers of systems equipped with the machine learning technique. Conventionally, there have been proposed methods for evaluating the accuracy of the machine learning technique. For example, "Information Retrieval—C. J. van Rijsbergen, 1979" discloses a method to quantitatively evaluate the parameter-dependent accuracy by using evaluation indices such as precision and recall.

However, although "Information Retrieval—C. J. van Rijsbergen, 1979" discloses a method to evaluate the accuracy of the machine learning technique as a single entity, it does not disclose a method to quantitatively evaluate a system as a whole including other pre-processing and post-processing in the system equipped with the machine learning technique.

SUMMARY

The present disclosure provides a technique to quantitatively evaluate the accuracy of the output of the entire image analysis system.

According to the first aspect of the present invention, there is provided an evaluation method for an image analysis system comprising: acquiring an output value by inputting an evaluation image to the image analysis system; acquiring an accuracy of the output by comparing an expected value and the output value; and evaluating characteristics of the image analysis system based on a relation between a factor and the accuracy of the output.

According to the second aspect of the present invention, there is provided an evaluation method for an image analysis system comprising: acquiring an output value by inputting an evaluation image to the image analysis system; acquiring an accuracy of the output by comparing an expected value and the output value; and acquiring a setting value range indicating ease of setting, based on a relation between a setting value of the image analysis system and the accuracy of the output.

Further features of the present disclosure will become apparent from the following description of exemplary embodiments with reference to the attached drawings.

BRIEF DESCRIPTION OF THE DRAWINGS

FIG. 1 is a diagram illustrating an example of a system configuration;

FIG. 2 is a diagram illustrating a configuration example of an image analysis system;

FIG. 3 is a diagram illustrating a configuration example of an evaluation system;

FIG. 4 is a diagram illustrating an example of a process flow;

FIG. 8 is a diagram illustrating a hardware configuration example of a computer apparatus.

DESCRIPTION OF THE EMBODIMENTS

Figure 5:
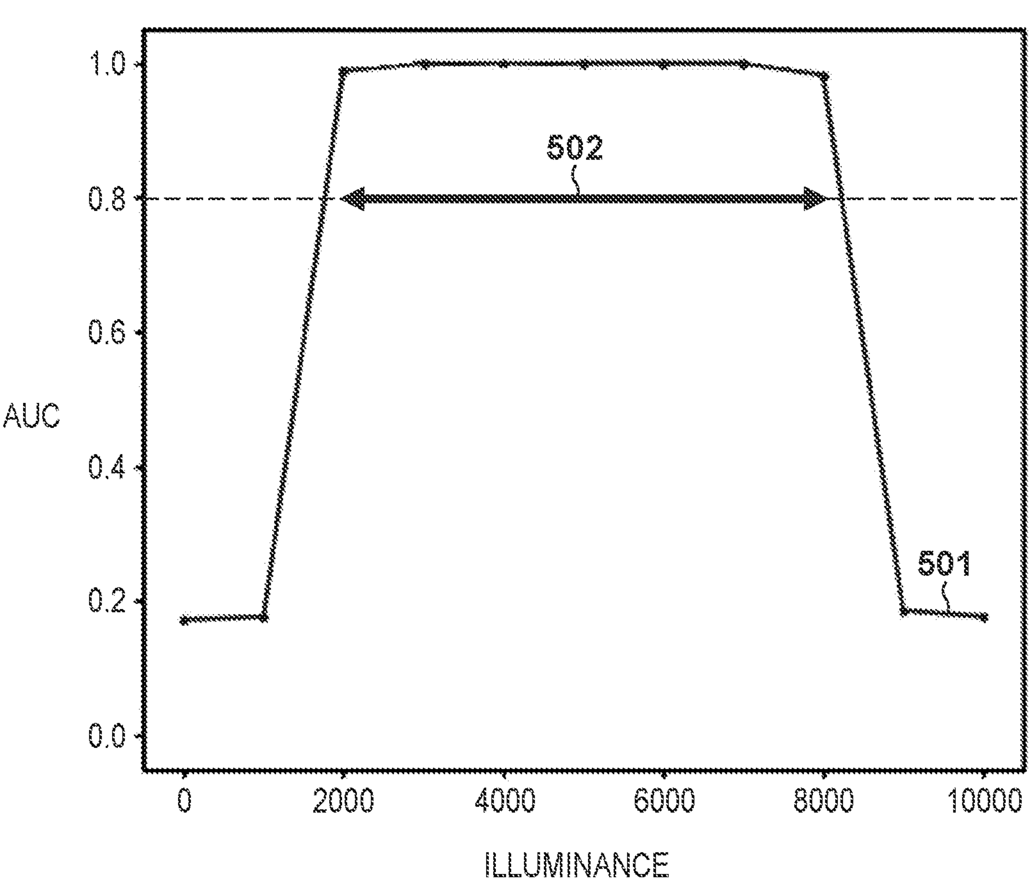
FIG. 5 is a diagram illustrating an example of accuracy factor evaluation.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

Although, in the embodiment, a case will be described in which the information processing apparatus is an image capturing apparatus, the information processing apparatus is not limited to an image capturing apparatus. For example, the information processing apparatus may be a terminal apparatus such as a desktop/notebook Personal Computer (PC) having an image capturing function, or a tablet terminal apparatus or a smartphone having an image capturing function.

First, a configuration example of a system according to the embodiment will be described, referring to the block diagram of FIG. 1. As illustrated in FIG. 1, the system according to the embodiment includes an image analysis system 101 and an evaluation system 102, in which the image analysis system 101 and the evaluation system 102 is configured to enable data communication with each other via a wired and/or wireless network.

First, a functional configuration example of the image analysis system 101 will be described, referring to the block diagram of FIG. 2. In the embodiment, a case will be described in which the image analysis system 101 is a stockout detection system that outputs a determination result of whether or not a stockout of merchandise is occurred in an input image. However, the image analysis system 101 is not limited to a case of such a stockout detection system, and may be any system that analyzes an input image and performs predetermined output of information.

An image input unit 201 acquires, as an input image, an image captured by itself or an image input from the outside.

A calculation unit 202 acquires occupancy indicating proportion of a region occupied by the merchandise in the input image acquired by the image input unit 201. For example, the calculation unit 202 determines, for each pixel in the input image, whether or not the pixel represents merchandise, and acquires, as the occupancy, a result of dividing the number of pixels determined to be representing the merchandise by the number of pixels determined not to be representing the merchandise. Here, the method described above for acquiring the occupancy is an example, but the method is not limited to any specific method.

A threshold input unit 203 acquires a threshold value input from the outside. The threshold is assumed to be an integer of 0 or more and 100 or less in the embodiment, but the threshold is not limited thereto. The threshold may be determined, for example, within a range of values that the occupancy may take, such that a preliminarily set range is determined within a range of domain of definition to have preliminarily set interval.

The threshold processing unit 204 performs size comparison between the occupancy acquired by the calculation unit 202 and the threshold acquired by the threshold input unit 203, and outputs the result of size comparison as a "determination result of whether or not a stockout of merchandise is occurred in an input image". For example, the threshold processing unit 204 outputs "not stockout" as the determination result when the occupancy is equal to or larger than the threshold, or outputs "stockout" as the determination result when the occupancy is less than the threshold. An output unit 205 outputs to the outside the determination result (either "stockout" or "not stockout") which has been output from threshold processing unit 204.

Next, a functional configuration example of the evaluation system 102 will be described, referring to the block diagram of FIG. 3. A generation unit 301 generates, based on the generation condition, an evaluation image that can be input to the image analysis system 101, for each generation condition, and generates, for each generation condition, a pair of the generation condition and an evaluation image corresponding to the generation condition.

Here, the generation condition in the embodiment is assumed to include number of the merchandise to be placed, size of the merchandise and illuminance (an example of external environmental factor). However, the information included in the generation condition is not limited to any specific information.

For example, the generation unit 301 generates, as an evaluation image corresponding to the generation condition, an image including merchandise pertaining to the "number", "size" and "illuminance" included in the generation condition. Here, the generation method of the evaluation image based on the generation condition is not limited to any specific generation method.

For each pair generated by the generation unit 301, the determination unit 302 inputs the evaluation image included in the pair to the image analysis system 101. Since the image analysis system 101 acquires the evaluation image as an input image and outputs a determination result corresponding to the input image, the determination unit 302 acquires the determination result from the image analysis system 101.

An expected value generation unit 303 generates a determination expected value of stockout or not stockout, based on the "number" (correct answer number) included in the generation condition. For example, the expected value generation unit 303 performs size comparison between the correct answer number and a number threshold, and generates the determination expected value of "not stockout" when the correct answer number is equal to or larger than the number threshold, or generates the determination expected value of "stockout" when the correct answer number is less than the number threshold.

The setting unit 304 sets, in the image analysis system 101, a setting value selected from a set of setting values (setting value set) that can be set in the image analysis system 101. In the embodiment, the setting unit 304 inputs, to the image analysis system 101 (threshold input unit 203), a threshold selected from the set of thresholds (threshold set) that can be set in the image analysis system 101. The threshold set is assumed to be integers of 0 or more and 100 or less in the embodiment, as with the domain of definition of the threshold that can be input to the threshold input unit 203, but the threshold set is not limited thereto. For example, the domain of definition to be evaluated may be preliminarily determined. Here, the number of steps with which the setting value is changed is assumed to be 100, but the number of steps is not limited thereto.

An accuracy evaluation unit 305 compares, for each generation condition, the determination result acquired by the determination unit 302 from the image analysis system 101 that is input with the evaluation image paired with the generation condition, with the determination expected value generated by the expected value generation unit 303 for the generation condition, and acquires the accuracy corresponding to the generation condition. In the embodiment, the accuracy is assumed to include precision and recall.

The evaluation unit 306 acquires an accuracy summary value from the setting value set and the accuracy for each generation condition. The accuracy summary value may be a value uniquely determined with respect to a setting value set, and is, for example, an Area Under Curve (AUC) that can be calculated from precision and recall. The evaluation unit 306 then specifies a "degree of influence on the accuracy, which is a degree of influence imposed on the accuracy summary value by the generation condition" from the correspondence relation between the generation condition and the accuracy summary value. The degree of influence on the accuracy may be, for example, a range of illuminance in which the accuracy summary value is equal to or larger than an accuracy summary value threshold. The degree of influence on the accuracy may also be, for example, a range of illuminance in which the accuracy summary value changes by a predetermined threshold or more.

FIG. 5 illustrates an example of accuracy factor evaluation. In FIG. 5, the horizontal axis represents the "illuminance included in the generation condition", and the vertical axis represents the accuracy summary value (AUC). A correspondence relation 501 is a line graph acquired by plotting, for each generation condition, points respectively corresponding to "a pair of illuminance included in a generation condition and an AUC acquired for the generation condition", and connecting the plotted points by straight lines. Here, there are various generation methods as a generation method for the correspondence relation 501 based on a group of the plotted points, such that a free curve interpolating a group of the plotted points may be used as the correspondence relation 501. In FIG. 5, the accuracy summary value threshold is 0.8, in which case an illuminance range 502 where the accuracy summary value is equal to or larger than the accuracy summary value threshold of "0.8" in the correspondence relation 501 is specified as the degree of influence on the accuracy.

The evaluation unit 306 then outputs the degree of influence on the accuracy specified in the aforementioned manner as the "result of accuracy factor evaluation for the image analysis system 101". The output destination of the degree of influence on the accuracy from the evaluation unit 306 is not limited to any specific output destination. For example, the evaluation unit 306 may transmit the degree of influence on the accuracy to an external apparatus via a network, output the degree of influence on the accuracy to its own database, or display the degree of influence on the accuracy and/or information representing the degree of influence on the accuracy, on a display apparatus as images, characters, or the like.

The evaluation unit 307 specifies a range of setting values, as a setting value range, in which the accuracy satisfies a predetermined condition, from the correspondence relation between each setting value included in the aforementioned setting value set and the accuracy acquired by performing the aforementioned processing based on the determination result from the image analysis system 101 being set with the setting value. The predetermined condition is assumed in the embodiment to be such that "the F value representing the harmonic mean of the precision and the recall is equal to or larger than a predetermined F value threshold", the predetermined condition is not limited to any specific condition. In addition, the F value may be any value provided that it is uniquely determined for each value of setting value.

Figure 6:
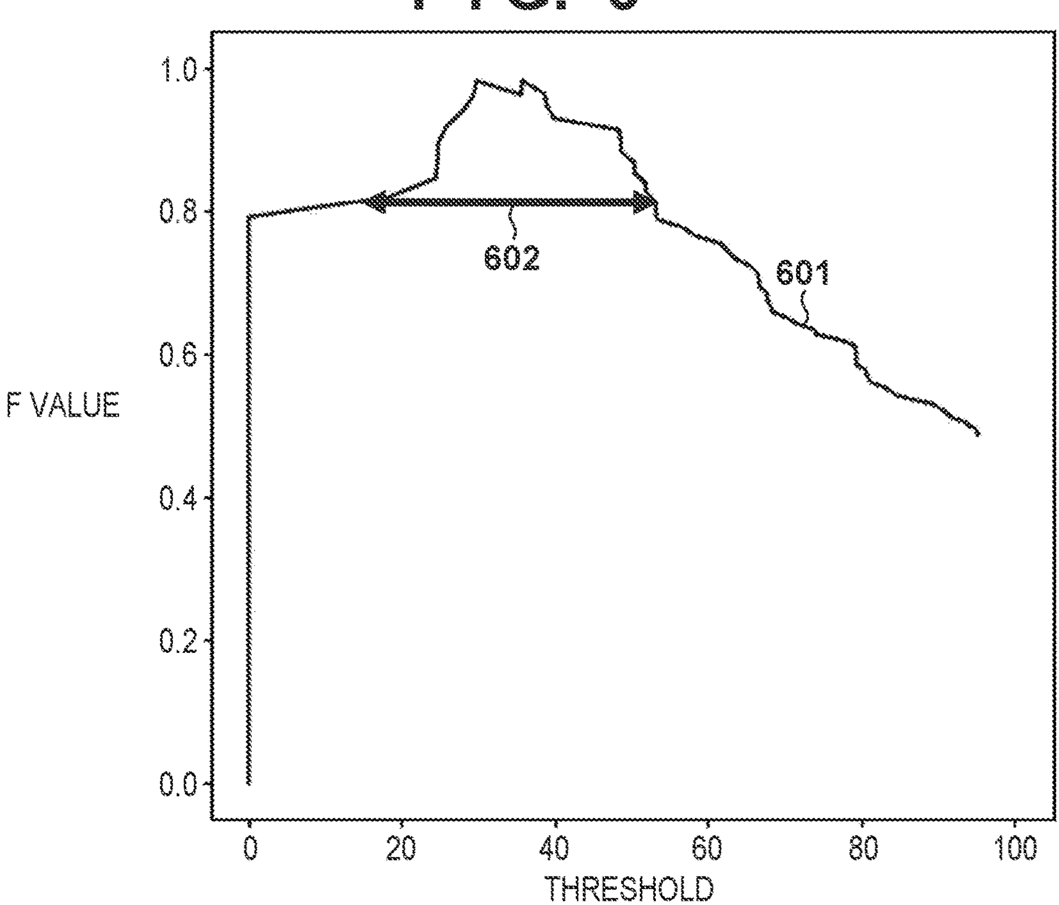
FIG. 6 is a diagram illustrating an example of setting evaluation.

FIG. 6 illustrates an example of setting evaluation. In FIG. 6, the horizontal axis represents the setting value (threshold), and the vertical axis represents the F value. A correspondence relation 601 is a line graph acquired by plotting, for each setting value (threshold), points respectively corresponding to "a pair of a setting value (threshold) and an F value acquired based on the accuracy acquired by performing the aforementioned processing based on the determination result from the image analysis system 101 being set with the setting value", and connecting the plotted points by straight lines. Here, there are various generation methods as a generation method for the correspondence relation 601 based on a group of the plotted points, such that a free curve interpolating a group of the plotted points may be used as the correspondence relation 601. In FIG. 6, the F value threshold is 0.8, in which case a range 602 of the setting value (threshold) where the F value is equal to or larger than the F value threshold of "0.8" in the correspondence relation 601 is specified as the setting value range.

The evaluation unit 307 then outputs the setting value range specified in the aforementioned manner as the "result of setting evaluation for the image analysis system 101". The output destination of the setting value range from the evaluation unit 307 is not limited to any specific output destination. For example, the evaluation unit 307 may transmit the setting value range to an external apparatus via a network, output the setting value range to its own database, or display the setting value range and/or information representing the setting value range, on a display apparatus as images, characters, or the like.

The evaluation unit 308 specifies a degree of influence on the setting value, which is a degree of influence imposed on the setting value range by the generation condition from a correspondence relation between a part of the generation condition and the setting value range corresponding to the generation condition. In the embodiment, the part of the generation condition is assumed to be the "size of merchandise (region size) included in the generation condition". The degree of influence on the setting value in the embodiment is assumed to be a range of a region size in which the setting value range is equal to or larger than the setting value range threshold. Here, the degree of influence on the setting value is not limited thereto and may be, for example, a range of a region size in which the setting value range changes by a setting value range threshold or more.

Figure 7:
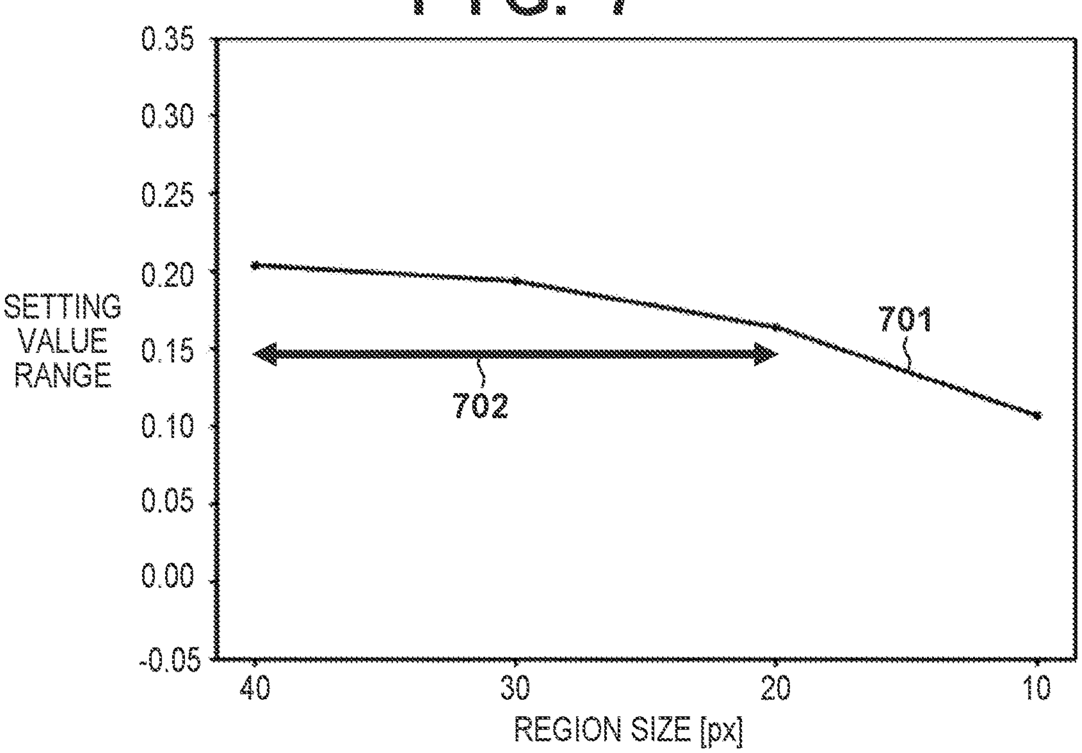
FIG. 7 is a diagram illustrating an example of setting factor evaluation.

FIG. 7 illustrates an example of the setting factor evaluation. In FIG. 7, the horizontal axis represents the "region size included in the generation condition", and the vertical axis represents the setting value range. A correspondence relation 701 is a line graph acquired by plotting, for each generation condition, points respectively corresponding to "a pair of a region size included in a generation condition and a setting value range acquired for the generation condition", and connecting the plotted points by a straight line. Here, there are various generation methods as a generation method for the correspondence relation 701 based on a group of the plotted points, such that a free curve interpolating a group of the plotted points may be used as the correspondence relation 701. In FIG. 7, the setting value range threshold is set to 0.15, in which case a range 702 of the region size where the setting value range is equal to or larger than the setting value range threshold of "0.15" in the correspondence relation 701 is specified as the degree of influence on the setting value.

The evaluation unit 308 then outputs the degree of influence on the setting value specified in the aforementioned manner as the "result of setting factor evaluation for the image analysis system 101". The output destination of the degree of influence on the setting value from the evaluation unit 308 is not limited to any specific output destination. For example, the evaluation unit 308 may transmit the degree of influence on the setting value to an external apparatus via a network, output the degree of influence on the setting value to its own database, or display the degree of influence on the setting value and/or information representing the degree of influence on the setting value, on a display apparatus as images, characters, or the like.

Next, an aforementioned operation of the evaluation system 102 will be described in accordance with the flowchart of FIG. 4. At step S401, the generation unit 301 generates an evaluation image for each generation condition, and generates, for each generation condition, a pair of the generation condition and the evaluation image corresponding to the generation condition. At step S402, the expected value generation unit 303 generates, for each generation condition, a determination expected value of stockout or not stockout, based on the "number" (correct answer number) included in the generation condition.

At step S403, the setting unit 304 selects, from a set of setting values that can be set in the image analysis system 101 (setting value set), a setting value, among setting values not being selected, as a selected setting value, and sets the selected setting value in the image analysis system 101.

At step S404, the determination unit 302 inputs, to the image analysis system 101 for each pair generated by the generation unit 301, an evaluation image included in the set and acquires the determination result output from the image analysis system 101.

At step S405, the accuracy evaluation unit 305 compares, for each generation condition, the determination result output from the image analysis system 101 for the evaluation image paired with the generation condition, and the determination expected value generated by the expected value generation unit 303 for the generation condition, and acquires the accuracy corresponding to the generation condition. The accuracy is assumed to be a Precision Recall Curve (PR curve), for example.

At step S406, the setting unit 304 determines whether or not all the setting values included in the setting value set is selected as the selected setting values. When, as a result of the determination, all the setting values included in the setting value set is selected as the selected setting values, the processing proceeds to step S407. When, on the other hand, there remains a setting value, which is not selected as a selected setting value, among the setting values included in the setting value set, the processing proceeds to step S403.

At step S407, the evaluation unit 306 acquires an accuracy summary value from the setting value set and the accuracy for each generation condition. The evaluation unit 306 then specifies the degree of influence on the accuracy from the correspondence relation between the generation condition and the accuracy summary value. The evaluation unit 306 then outputs the degree of influence on the accuracy specified in the aforementioned manner as the "result of accuracy factor evaluation for the image analysis system 101".

At step S408, the evaluation unit 307 specifies a setting value range from the correspondence relation between each setting value included in the aforementioned setting value set and the accuracy acquired by performing the aforementioned processing based on the determination result from the image analysis system 101 set with the setting value. The evaluation unit 307 then outputs the setting value range specified in the aforementioned manner as the "result of setting evaluation for the image analysis system 101".

At step S409, the evaluation unit 308 specifies the degree of influence on the setting value from the correspondence relation between a part of the generation condition and the setting value range corresponding to the generation condition. The evaluation unit 308 then outputs the degree of influence on the setting value specified in the aforementioned manner as the "result of setting factor evaluation for the image analysis system 101".

Although the processing in steps S407 to S409 in the embodiment are assumed to be performed for all the setting values included in the setting value set, it may also be assumed to be performed for only a part of the setting values included in the setting value set.

Here, in the embodiment, a condition is assumed such that the value being evaluated (evaluation value) is equal to or larger than a certain value, but the condition is not limited thereto. In addition, when there are a plurality of ranges in which the evaluation value satisfies the condition, the evaluation value may be changed in accordance with the number of ranges. Although the occupancy is used in the embodiment, likelihood may be used in place thereof. In addition, there may be a plurality of setting values.

In addition, the image analysis systems 101 may be assumed to be factors, and one of the image analysis systems 101 and the other of the image analysis systems 101 may be compared as factors. In this case, the generation unit generates the image analysis system 101 as a generation condition, and the determination unit determines according to the generation condition.

In addition, an audio analysis system may be the evaluation target in place of the image analysis system 101, any machine learning system may be used as the evaluation target. In addition, any other information such as region size may be used in place of illuminance.

As such, the entire machine learning system can be quantitatively evaluated, according to the embodiment. In addition, the accuracy of the entire image analysis system can be evaluated by using the degree of influence on the accuracy.

In addition, the embodiment allows for quantitatively evaluating the ease of setting the system. In addition, the ease of setting the image analysis system can be represented in a numerical value by using the degree of influence on the setting value.

Modification Example 1

When there are a plurality of the image analysis systems 101, the evaluation of each of the image analysis systems 101 may be compared. The setting unit 304 incorporates, in the setting value, information indicating which image analysis system 101 is used.

Modification Example 2

A captured image capturing merchandise in an actual environment may be used as the evaluation image. In such a case, a group of images are prepared, in which images are captured by removing merchandise one by one from a state where enough number of merchandise is exhibited (e.g., X number of merchandise). Subsequently, shooting condition (e.g., a position and brightness of the light source) in the environment are stored as generation condition, in association with the captured image. The generation condition further associates, as a correct answer value, a number X with an image captured in a state where X number of merchandise are arranged. Data of a pair of the group of the images and the generation condition prepared as described above is stored in an external storage apparatus, and acquired by the evaluation system 102 in the processing at steps S401 to S403.

Second Embodiment

The functional units illustrated in FIGS. 2 and 3 may be implemented by hardware, or may be implemented by software (computer program In the latter case, the computer apparatus that can execute the computer program can be applied to the image analysis system 101 or the evaluation system 102. A hardware configuration example of the computer apparatus that can be applied to the image analysis system 101 or the evaluation system 102 will be described, referring to the block diagram of FIG. 8.

A CPU 801 performs various processing using computer programs and data stored in a RAM 802 or a ROM 803. Accordingly, the CPU 801 controls the operation of the entire computer apparatus, and also executes or controls each of the processing described above to be performed by the image analysis system 101 or the evaluation system 102.

The RAM 802 includes an area for storing computer programs and data loaded from the ROM 803 or an external storage apparatus 806, and an area for storing computer programs and data received from the outside via an I/F 807. Furthermore, the RAM 802 includes a work area that is used when the CPU 801 executes various processing. As described above, the RAM 802 can provide various types of areas as appropriate.

The ROM 803 stores setting data of the computer apparatus, computer programs and data related to activation of the computer apparatus, computer programs and data related to basic operations of the computer apparatus, or the like.

An operation unit 804, which is a user interface such as a keyboard, a mouse, a touch panel, or the like, allows various instructions to be input to the CPU 801 by a user operation.

A display unit 805, which includes a liquid crystal screen or a touch panel screen, can display results of processing by the CPU 801 as images, characters, or the like. For example, the display unit 805 may display the degree of influence on the accuracy and/or information representing the degree of influence on the accuracy, the setting value range and/or information representing the setting value range, the degree of influence on the setting value and/or information representing the degree of influence on the setting value, or the like.

The external storage apparatus 806 is a large-capacity information storage apparatus such as a hard disk drive apparatus. The external storage apparatus 806 stores the Operating System (OS), computer programs and data for causing the CPU 801 to execute or control the processing described to be performed by the image analysis system 101 or the evaluation system 102, or the like.

The computer programs and data stored in the ROM 803 or the computer programs and data stored in the external storage apparatus 806 are loaded to the RAM 802 in accordance with the control by the CPU 801, as appropriate, to be processed by the CPU 801.

An I/F 807 is a communication interface configured to perform data communication with the outside (the outside is the evaluation system 102 when the apparatus is the image analysis system 101, or the outside is the image analysis system 101 when the apparatus is the evaluation system 102). The CPU 801 can perform data communication with the outside via the I/F 807.

The CPU 801, the RAM 802, the ROM 803, the operation unit 804, the display unit 805, the external storage apparatus 806, and the I/F 807 are all connected to a system bus 808. Here, the hardware configuration illustrated in FIG. 8 is an example of hardware configuration that can be applied to the image analysis system 101 or the evaluation system 102, and may be varied/modified as appropriate. In addition, the hardware configuration of the computer apparatus applied to the image analysis system 101 and the hardware configuration of the computer apparatus applied to the evaluation system 102 may be same or may be different each other.

In addition, numerical values, processing timing, order of processing, entity of processing, and acquisition method/transmission destination/transmission source/storage location of data (information) or the like, used in the aforementioned embodiments and modification examples are given as an example for providing specific description, and not intended to limit to such an example.

In addition, a part or all of the aforementioned embodiments and modification examples may be used in combination as appropriate. A part or all of the aforementioned embodiments and modification examples may be selectively used.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154003, filed Sep. 27, 2022, which is hereby incorporated by reference herein in its entirety.

What is claimed is:

1. An evaluation method for an image analysis system comprising one or more memories storing instructions, and one or more processors executing the instructions to: acquire an input image, analyze the input image based on a setting value which is set to the image analysis system, and output an analysis result of the input image, the evaluation method comprising:

performing a second process by setting each of a plurality of setting values for the analysis to the image analysis system to perform a first process, wherein the first process is a process in which an evaluation image corresponding to a factor is input to the image analysis system to acquire an analysis result of the evaluation image corresponding to the factor, and wherein the second process is a process for acquiring the analysis results corresponding to the plurality of setting values;

performing a third process in which an accuracy for the factor is obtained by comparing an expected value of the analysis corresponding to the evaluation image corresponding to the factor with the analysis results corresponding to the plurality of setting values; and evaluating characteristics of the image analysis system based on (i) an accuracy for each of a plurality of factors obtained by performing the first process, the second process, and the third process for the plurality of factors, and (ii) the plurality of factors.

2. The evaluation method according to claim 1, wherein the accuracy for the factor is a Precision-Recall (PR) curve.

3. The evaluation method according to claim 1, wherein the analysis result of the evaluation image is binary, and the accuracy of the output is an Area Under Curves (AUCs) of a Precision-Recall (PR) curves corresponding to the plurality of factors and the plurality of factors.

4. The evaluation method according to claim 1, wherein the factor is at least one of an external environmental factor and an internal processing factor.

5. The evaluation method according to claim 4, wherein the external environmental factor is at least one of illuminance, color of illumination, saturation, contrast, brightness, sharpness, white balance, noise and compression ratio of the evaluation image.

6. The evaluation method according to claim 4, wherein the external environmental factor is based on at least one of a shape, size, color, a position and density of an object in the evaluation image.

7. The evaluation method according to claim 4, wherein the external environmental factor is based on at least one of a shape, size, color and a position of a region in the evaluation image.

8. The evaluation method according to claim 4, wherein the external environmental factor is at least one of a shooting angle and occlusion of the evaluation image.

9. The evaluation method according to claim 4, wherein the internal processing factor is a plurality of analysis processing having different characteristics in accordance with the external environmental factor.

10. An evaluation method for an image analysis system comprising one or more memories storing instructions and one or more processors executing the instructions to: acquire an input image, analyze the input image based on a setting value which is set to the image analysis system, and output an analysis result of the input image, the evaluation method comprising:

performing a second process by setting each of a plurality of setting values for the analysis to the image analysis system to perform a first process, wherein the first process is a process in which an evaluation image corresponding to a factor is input to the image analysis system to acquire an analysis result of the evaluation image corresponding to the factor, and wherein the second process is a process for acquiring the analysis results corresponding to the plurality of setting values;

performing a third process in which an accuracy for the factor is obtained by comparing an expected value of the analysis corresponding to the evaluation image corresponding to the factor with the analysis results corresponding to the plurality of setting values; and acquiring a setting value range indicating an ease of setting, based on (i) an accuracy for each of a plurality of factors obtained by performing the first process, the second process, and the third process for the plurality of factors, and (ii) the plurality of setting values.

11. The evaluation method according to claim 10, wherein the accuracy for the factor is a Precision-Recall (PR) curve.

12. The evaluation method according to claim 11, wherein the analysis result of the evaluation image is binary, and the setting value range is acquired based on a relation between the F value representing a harmonic mean of a recall and a precision included in the accuracy and the setting value.

13. The evaluation method according to claim 11, wherein the setting value range is a range of the setting value with which the F value is equal to or larger than a predetermined value.

14. The evaluation method according to claim 10, wherein the factor is at least one of an external environmental factor and an internal processing factor.

15. The evaluation method according to claim 14, wherein the external environmental factor is any one or more than one of illuminance, color of illumination, saturation, contrast, brightness, sharpness, white balance, noise and compression ratio of the evaluation image.

16. The evaluation method according to claim 14, wherein the external environmental factor is based on any one or more than one of a shape, size, color, a position and density of an object in the evaluation image.

17. The evaluation method according to claim 14, wherein the external environmental factor is based on any one or more than one of a shape, size, color and a position of a region in the evaluation image.

18. The evaluation method according to claim 14, wherein the external environmental factor is any one or more than one of a shooting angle and occlusion of the evaluation image.

19. The evaluation method according to claim 14, wherein differentiating processing between a past frame and an input image is performed, and the internal processing factor is a setting value of either difference likelihood or difference occupancy of the differentiating processing.

20. The evaluation method according to claim 14, wherein differentiating processing between a feature amount extracted from a past frame and a feature amount extracted from an input image is performed, and the internal processing factor is a setting value of either difference likelihood or difference occupancy of the differentiating processing.

21. The evaluation method according to claim 14, wherein the internal processing factor is a plurality of analysis processing having different characteristics in accordance with the external environmental factor.

* * * * *